US012726289B2

(12) United States Patent
Lu et al.

(10) Patent No.: US 12,726,289 B2
(45) Date of Patent: Sep. 1, 2026

(54) TIME SYNCHRONIZATION METHOD AND TIME SYNCHRONIZATION DEVICE

(71) Applicant: Moxa Inc., New Taipei City (TW)

(72) Inventors: Yi-Feng Lu, New Taipei City (TW); Chien-Yu Lai, New Taipei City (TW); Chi-Chuan Liu, New Taipei City (TW); Po-Hung Lin, New Taipei City (TW); Hou-Chen Liu, New Taipei City (TW)

(73) Assignee: Moxa Inc., New Taipei City (TW)

(*) Notice: Subject to any disclaimer, the term of this patent is extended or adjusted under 35 U.S.C. 154(b) by 303 days.

(21) Appl. No.: 18/513,675

(22) Filed: Nov. 20, 2023

(65) Prior Publication Data

US 2025/0132852 A1 Apr. 24, 2025

(30) Foreign Application Priority Data

Oct. 19, 2023 (TW) ................................ 112139926

(51) Int. Cl.
*H04J 3/06* (2006.01)

(52) U.S. Cl.
CPC .......... *H04J 3/0667* (2013.01); *H04J 3/0617* (2013.01); *H04J 3/0644* (2013.01)

(58) Field of Classification Search
CPC ...... H04J 3/0667; H04J 3/0617; H04J 3/0644; H04J 3/14; G05B 19/042
See application file for complete search history.

(56) References Cited

U.S. PATENT DOCUMENTS

| | | | | |
|---|---|---|---|---|
| 11,099,599 | B2 * | 8/2021 | El Kolli | H04J 3/0697 |
| 11,177,897 | B2 * | 11/2021 | Evans | H04J 3/0673 |
| 11,750,311 | B1 * | 9/2023 | Devarajan | H04J 3/0685 370/503 |
| 12,500,683 | B2 * | 12/2025 | McCall | H04J 3/0658 |
| 2013/0227172 | A1 | 8/2013 | Zheng | |
| 2015/0163000 | A1 | 6/2015 | Aweya | |
| 2016/0359610 | A1 * | 12/2016 | Karthik | H04J 3/0664 |

(Continued)

FOREIGN PATENT DOCUMENTS

| | | |
|---|---|---|
| TW | M433682 U1 | 7/2012 |
| TW | I669014 B | 8/2019 |

(Continued)

OTHER PUBLICATIONS

SMPTE EG 2059-10:2016, SMPTE Engineering Guideline—Introduction to the New Synchronization System, The Society of Motion Picture and Television Engineers, IEEE, p. 1-16, Jul. 15, 2016.

(Continued)

*Primary Examiner* — Bailor C Hsu
(74) *Attorney, Agent, or Firm* — Winston Hsu

(57) ABSTRACT

A time synchronization method is provided for a time synchronization device, wherein the time synchronization device runs a plurality of precision time protocol (PTP) instances to connect to a plurality of time synchronization domains respectively. The time synchronization method includes determining whether a frequency of a local PTP clock of the time synchronization device is changed; and updating a frequency of a local clock of the time synchronization device with the frequency of the local PTP clock in response to the frequency of the local PTP clock being changed.

10 Claims, 5 Drawing Sheets

(56) References Cited

U.S. PATENT DOCUMENTS

| | | | | |
|---|---|---|---|---|
| 2017/0359138 | A1 | 12/2017 | Butterworth | |
| 2019/0190635 | A1* | 6/2019 | Goel | H04W 72/0453 |
| 2019/0205272 | A1* | 7/2019 | Fodor | G06F 16/903 |
| 2020/0162234 | A1* | 5/2020 | Almog | H04L 7/10 |
| 2020/0280383 | A1 | 9/2020 | Herber | |
| 2022/0123849 | A1* | 4/2022 | McCall | H04J 3/0658 |
| 2022/0295437 | A1* | 9/2022 | Maluf | H04W 56/001 |
| 2022/0345417 | A1* | 10/2022 | Kasichainula | H04L 47/30 |
| 2023/0155709 | A1 | 5/2023 | Speicher | |
| 2023/0156647 | A1* | 5/2023 | Carrasco Quilis | H04W 56/0015 370/350 |
| 2023/0421279 | A1* | 12/2023 | Imao | H04J 3/0641 |

FOREIGN PATENT DOCUMENTS

| | | | |
|---|---|---|---|
| TW | I772843 | B | 8/2022 |
| WO | 2021/005517 | A1 | 1/2021 |

OTHER PUBLICATIONS

LAN/MAN Standards Committee of the IEEE Computer Society Time-Sensitive Networking Task Group of IEEE 802.1, Draft Standard for Local and metropolitan area networks—Timing and Synchronization for Time-Sensitive Applications Amendment: Hot Standby, P802.1ASdm/D1.3, Oct. 12, 2023, pp. 1-180, XP068206564 ,Oct. 12, 2023.

LAN/MAN Standards Committee of the IEEE Computer Society, IEEE Standard for Local and Metropolitan Area Networks—Timing and Synchronization for Time-Sensitive Applications, IEEE Std 802.1ASTM-2020, Jun. 19, 2020, cover page, pp. 1-420, XP068168213 ,Jun. 19, 2020.

* cited by examiner

TIME SYNCHRONIZATION METHOD AND TIME SYNCHRONIZATION DEVICE

BACKGROUND OF THE INVENTION

1. Field of the Invention

The present invention relates to a time synchronization method and a time synchronization device, and more particularly, to a time synchronization method and a time synchronization device for improving the accuracy of time synchronization while performing time synchronization across multiple time synchronization domains.

2. Description of the Prior Art

Precision Time Protocol (PTP), as defined by IEEE 1588, is a standard for time synchronization that is used to achieve high-precision time synchronization throughout a time-critical network. As the market continues to evolve, various network applications have emerged with unique requirements. To cater to these needs, numerous PTP profiles have been proposed for specific applications, such as Power Profile (IEEE Std C37.238) for power networks, Telecom Profile (ITU-T G. 8265.1) for telecommunication networks, and Generalized Precision Time Protocol (gPTP, IEEE Std 802.1AS). PTP profiles enable applications in diverse fields to establish specific operating parameters, attributes, and default values that align with their requirements. However, this diversity can pose challenges for devices and networks that use different PTP profiles to communicate effectively. In general, in order to ensure time synchronization, apparatuses or devices within the same environment must adhere to the same PTP profile, making cross-domain time integration a complex task.

The conventional technology achieves the integration of multiple PTP profiles through a time gateway, allowing different time synchronization domains or devices, each using a unique PTP profile, to synchronize time according to a specified grandmaster (GM) clock. Accordingly, different time synchronization domains using different types of PTP profiles are able to achieve time synchronization.

However, in practical applications, the synchronization mechanisms between the two protocols, IEEE 1588 and gPTP complying with IEEE Std 802.1AS, are not the same. This discrepancy, along with the difference in frequency between the local PTP clock and the local clock of the time gateway, can lead to timing errors when synchronizing across time synchronization domains that use different PTP profiles. Moreover, during time synchronization, different PTP profiles or machines from various manufacturers may employ distinct verification mechanisms, and the frequency difference may also cause the time synchronization across PTP profiles through a time gateway to fail the verification process and not operate as expected. Therefore, there is an urgent need to improve the prior art.

SUMMARY OF THE INVENTION

Therefore, the present invention is to provide a time synchronization method and device for improving the accuracy of time synchronization while integrating multiple devices or networks using various types of PTP profiles, so as to improve the prior art.

An embodiment of the present invention discloses a time synchronization method for a time synchronization device, where the time synchronization device runs a plurality of PTP instances to connect to a plurality of time synchronization domains respectively. The time synchronization method includes determining whether a frequency of a local PTP clock of the time synchronization device is changed; and updating a frequency of a local clock of the time synchronization device with the frequency of the local PTP clock in response to the frequency of the local PTP clock being changed.

An embodiment of the present invention further discloses a time synchronization device. The time synchronization device is configured to run a plurality of PTP instances to connect to a plurality of time synchronization domains respectively and includes a processing unit and a storage unit. The processing unit is configured to execute a program code, and the storage unit is coupled to the processing unit and configured to store the program code to instruct the processing unit to execute a time synchronization method. The time synchronization method includes determining whether a frequency of a local PTP clock of the time synchronization device is changed; and updating a frequency of a local clock of the time synchronization device with the frequency of the local PTP clock in response to the frequency of the local PTP clock being changed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to".

Figure 1:
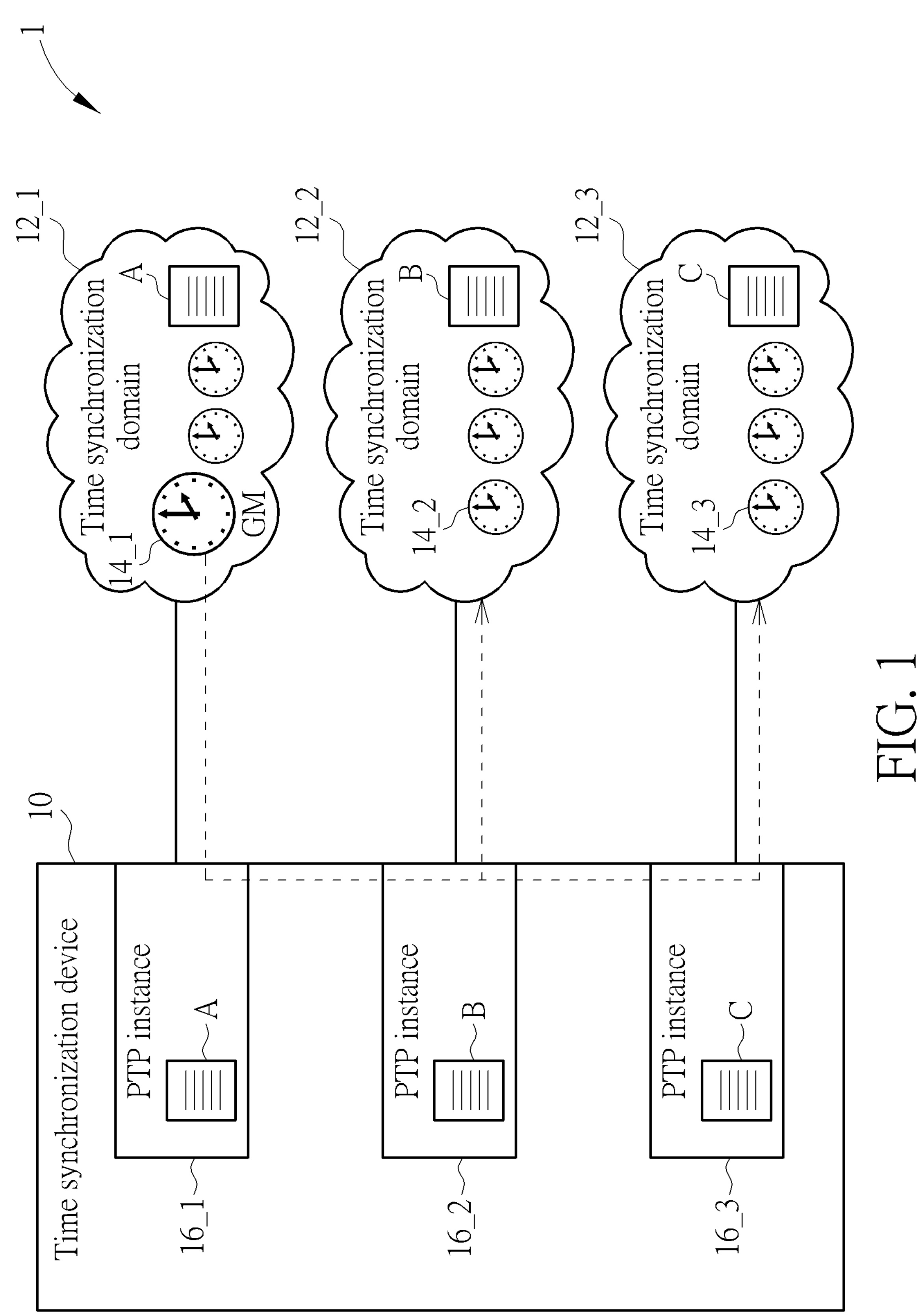
FIG. 1 is a schematic diagram of a time synchronization network system comprising a plurality of time synchronization domains according to an embodiment of the present invention.

Please refer to FIG. 1, which is a schematic diagram of a time synchronization network system 1 according to an embodiment of the present invention. The time synchronization network system 1 comprises time synchronization domains 12_1-12_3 and a time synchronization device 10. The time synchronization domains 12_1-12_3 may be time synchronization domains operating according to specifications of different types of precision time protocol (PTP) profiles, wherein each time synchronization domain may be a wired network, a wireless network, or a combination thereof. Moreover, each of the time synchronization domains 12_1-12_3 may be a network domain composed of multiple devices and multiple network switches (including a plurality of clocks), or a network domain composed of a single device (with only one clock). The time synchronization domains 12_1-12_3 are respectively time synchronization domains operating according to the specifications of different types of PTP profiles A-C.

The time synchronization device 10 may be and not limited to network devices such as gateways, switches, routers, and bridges running in the time synchronization domain, and respectively connect to the time synchronization domains 12_1-12_3 through a plurality of ports (not shown in FIG. 1). The time synchronization domains 12_1-12_3 time through a time perform synchronization synchronization device 10, and thereby all devices and apparatuses in the time synchronization domains 12_1-12_3 synchronize on the basis of the clock time of the same grandmaster clock.

It should be noted that without the time synchronization device 10, each of the time synchronization domains 12_1-12_3 runs time synchronization mechanisms according to different PTP profiles, and therefore, the cross-domain time synchronization cannot be performed in general. In this situation, each time synchronization domain has a best clock (such as best clocks 14_1-14_3 in FIG. 1) as a grandmaster clock for each time synchronization domain. That is to say, without the time synchronization device 10, the devices belonging to the same time synchronization domain respectively perform time synchronization on the basis of the grandmaster clock of the time synchronization domain which the devices belong to. The best clock refers to the most ideal clock (for a specific time synchronization domain) evaluated based on factors such as clock source, time accuracy, and stability of an oscillator, and may also be determined manually as the most suitable clock (for a specific time synchronization domain).

In the embodiment of the present invention, the time synchronization domains 12_1-12-3 may perform time synchronization through the time synchronization device 10, so that all apparatuses and devices in the time synchronization domains 12_1-12_3 may be synchronized according to a grandmaster clock 14_1 of a specified network domain. It should be noted, in the time synchronization network system 1, the number of time synchronization domains 12_1 to 12_3 is 3, which is for illustration. The time synchronization device 10 of the embodiment of the present invention may be applied to any number of time synchronization domains for time synchronization, and is not limited thereto. In addition, in the description, the time synchronization device 10 uses the best clock 14_1 of the time synchronization network domain 12_1 as the grandmaster clock of the time synchronization network system 1 to perform time synchronization. However, the time synchronization network system 1 may also perform time synchronization based on one of the best clocks 14_2 and 14_3 of the time synchronization network domains 12_2 and 12_3. The grandmaster clock in the time synchronization network system 1 may be designated manually or may be determined by the time synchronization device 10 by comparing the capability information of each clock in the PTP Announcement message received from each time synchronization network domain 12_1-12_3, such as timePropertiesDS (Time Properties Parameter Data Set), parentDS (Parent Parameter Data Set) or the corresponding priority vector (Time-synchronization Spanning Tree Priority Vector), and are not limited thereto. In the embodiment, when the best clock 14_1, which is the grandmaster clock, malfunctions or fails, the grandmaster clock may be immediately replaced by other better clock in the time synchronization domain 12_1 or the best clocks 14_2, 14_3 in the time synchronization domains 12_2, 12_3 so as to continue the time synchronization.

In detail, in the embodiment of the present invention, the time synchronization device 10 builds PTP instances 16_1-16_3 corresponding to the time synchronization domains 12_1-12_3. The PTP instances 16_1-16_3 use the same types of PTP profiles corresponding to the connected time synchronization domains 12_1-12_3, so the PTP instances 16_1-16_3 may exchange PTP messages with the connected time synchronization domains and serve as a communication medium between the time synchronization device 10 and the time synchronization domains 12_1-12_3. In other words, the time synchronization domains 12_1-12_3 may run according to different types of PTP profiles that are not limited to Telecom Profile, Power Profile, gPTP, etc., and the PTP instances 16_1-16_3 should operate according to the PTP profiles corresponding to the time synchronization domains 12_1-12_3 and should run as one node of the corresponding time synchronization domain.

Taking the best clock 14_1 as the grandmaster clock of the time synchronization network system 1 for time synchronization as an example, all equipment and devices in the time synchronization network system 1 are synchronized according to the time of the grandmaster clock 14_1. In the embodiment of the present invention, the port corresponding to the PTP instance 16_1 is a time receiving port, and the ports corresponding to the PTP instance 16_2 and 16_3 are time transmitting ports. The time receiving port refers to the port used to receive information such as the clock and time, or the port with port state (portState) set to be SlavePort according to the specification of PTP; the time transmitting port refers to the port used to transmit information such as clock and time, or the port with port state set to be MasterPort according to the specification of PTP. The time synchronization device 10 receives the PTP message of the grandmaster clock 14_1 from the PTP instance 16_1 via the time receiving port, and transmits the clock and time information of the grandmaster clock 14_1 to the time synchronization domains 12_2 and 12_3 through the PTP instances 16_2 and 16_3 via the time transmitting port. In this process, the PTP instances 16_2 and 16_3 convert the information of the grandmaster clock 14_1 according to the PTP profiles B and C respectively to generate clock information that may be read by the time synchronization domains 12_2 and 12_3. Accordingly, the time synchronization device 10 realizes time synchronization across the time synchronization domains 12_1 to 12_3.

However, the mechanism of time synchronization varies among different PTP profiles. For example, the time synchronization mechanism of gPTP calculates time based on a rate ratio between the grandmaster clock and a local clock (generally known as the free running clock); however, the rate ratio is not used in the synchronization methods of the remaining IEEE 1588 PTP profiles. In addition, in the time synchronization mechanism of gPTP, the timestamp of a packet (or message) is marked according to the time of the local clock when sending a PTP message. In contrast, in the synchronization method of the other IEEE 1588 PTP profiles, the timestamp of the packet is marked according to the time of the local PTP clock when sending PTP messages. With this difference, when the time synchronization domain connected to the time synchronization device 10 includes both the time synchronization domain using IEEE 1588 profiles and gPTP profiles, errors in measurement of the path delay and the PTP message residence time will occur. When multiple time synchronization devices are used to connect multiple time synchronization domains using different PTP profiles, the errors will gradually accumulate and cause serious problems.

Figure 2:
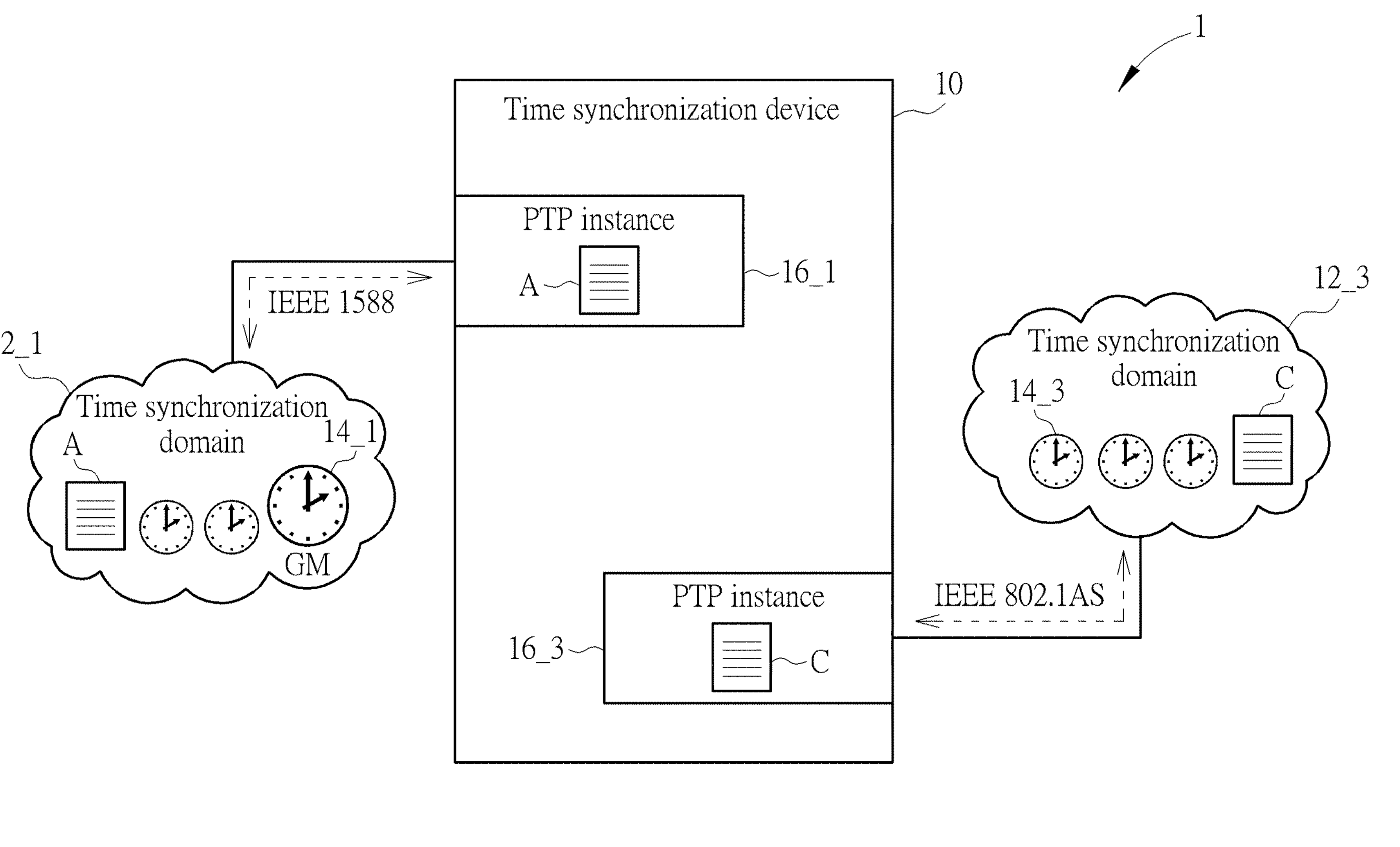
FIG. 2 is a schematic diagram of a time synchronization network system according to an embodiment of the present invention.

For the sake of illustration, as shown in FIG. 2 where the time synchronization network system 1 is simplified, assume that the PTP profile A used by the time synchronization domain 12_1 in the time synchronization network system 1 is a PTP profile using IEEE 1588, and the PTP profile B used by the time synchronization domain 12_3 is a PTP profile using gPTP. Specifically, the PTP instance 16_1 operates according to the IEEE 1588 protocol. After receiving a PTP Sync message from grandmaster clock 14_1, the PTP instance 16_1 calculates the frequency and updates the local PTP clock of PTP instance 16_1 and thereby simultaneously updates the local PTP clock of PTP instance 16_3. However, the communication between the grandmaster clock 14_1 and the PTP instance 16_1 complies with IEEE 1588, while the communication between the PTP instance 16_3 and the devices in the time synchronization domain 12_3 complies with IEEE 802.1AS. In this situation, the PTP instance 16_3 timestamps the packets and sends synchronization messages with the time of the local clock in accordance with IEEE 802.1AS, and therefore, the devices in the time synchronization domain 12_3 will not be able to obtain an accurate rate ratio of the grandmaster clock 14_1 to the devices themselves, resulting in an error.

Figure 3:
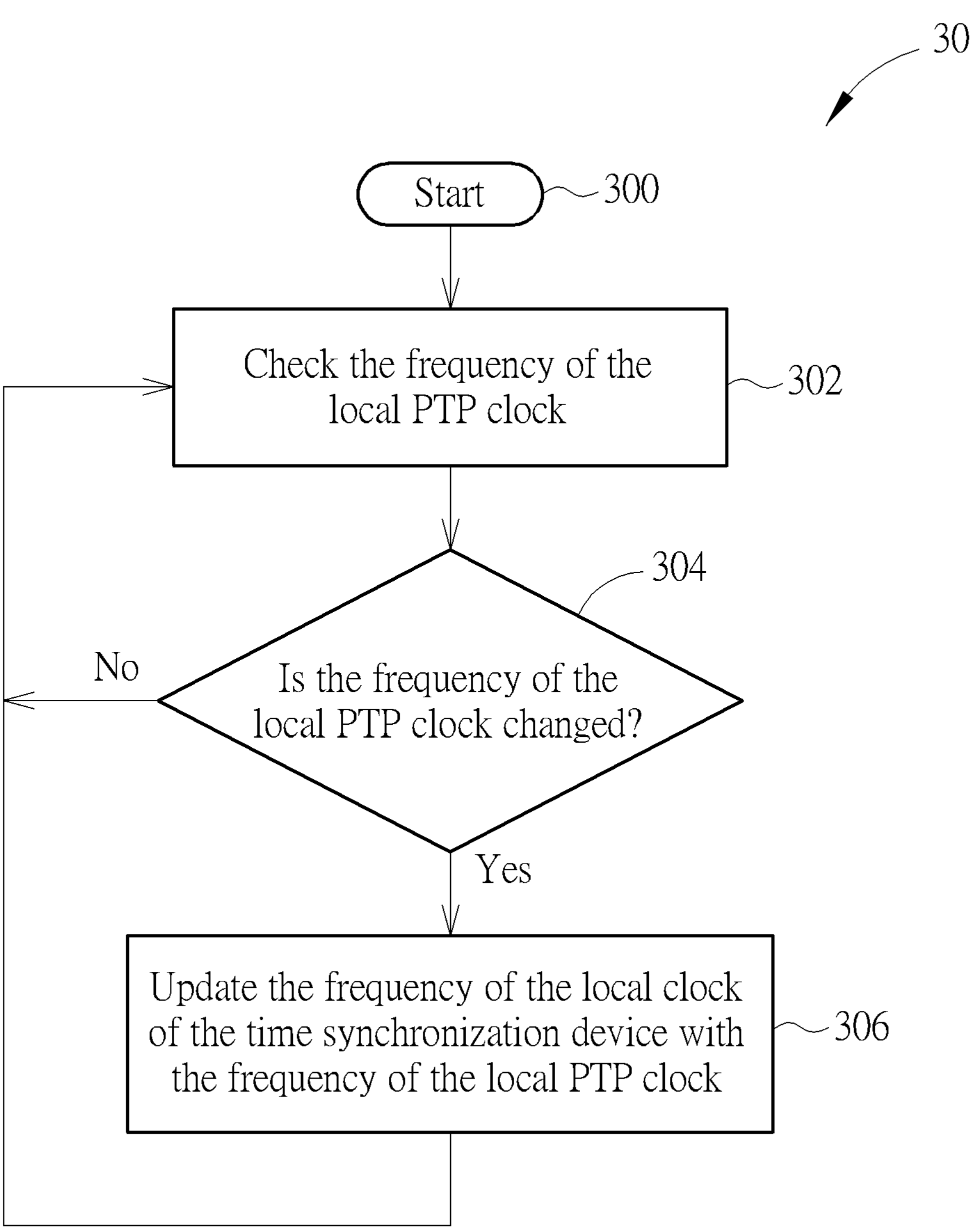
FIG. 3 is a schematic diagram of a time synchronization process according to an embodiment of the present invention.

In order to compensate for the impact caused by crossing time synchronization domains that use different PTP profiles, an embodiment of the present invention performs a time synchronization method by the time synchronization device 10 to achieve time synchronization across time domains with higher accuracy. The time synchronization method may be summarized into a time synchronization process 30 as shown in FIG. 3. The time synchronization process 30 comprises the following steps:

Step 300: Start.

Step 302: Check the frequency of the local PTP clock.

Step 304: Determine whether the frequency of the local PTP clock is changed. If yes, proceed to Step 306; otherwise, proceed to Step 302.

Step 306: Update the frequency of the local clock of the time synchronization device with the frequency of the local PTP clock.

According to the time synchronization process 30, the time synchronization device 10 checks the frequency of the local PTP clock (Step 302). When the frequency of the local PTP clock changes (Step 304), the frequency of the local clock of the time synchronization device 10 is updated with the frequency of the local PTP clock (Step 306). Accordingly, the frequencies between the local clock of the time synchronization device 10 and the local PTP clock may be synchronized, smoothing g out the effects of crossing time synchronization domains that use different PTP profiles.

Specifically, the time synchronization device 10 continues to receive PTP messages from the grandmaster clock 14_1, calculate time according to the protocol belonging to the PTP profile A used by the network domain where the grandmaster clock 14_1 is located, and update the local PTP clock. It should be noted, the grandmaster clock of the time synchronization network system 1 may change or be updated to a clock belonging to a domain different: from the time synchronization domain 12_1. Therefore, the time synchronization process 30 of the embodiment of the present invention needs to continuously operate and monitor to adapt to changes. Once the time synchronization device 10 detects a change in the frequency of the local PTP clock, the new frequency must be synchronized to the local clock of the time synchronization device 10 so that the local PTP clock and the local clock are able to be synchronized.

In the situation where the local PTP clock and the local clock of the time synchronization device 10 are synchronized in frequency, when the PTP instances 16_1-16_3 send PTP messages, the PTP instances operating with the IEEE 1588 protocol or the IEEE 802.1AS protocol are able to timestamp the packets with a consistent time. Thus, a rate ratio with a higher accuracy may be calculated to improve the time accuracy of time synchronization across time synchronization domains using different PTP profiles.

Figure 4:
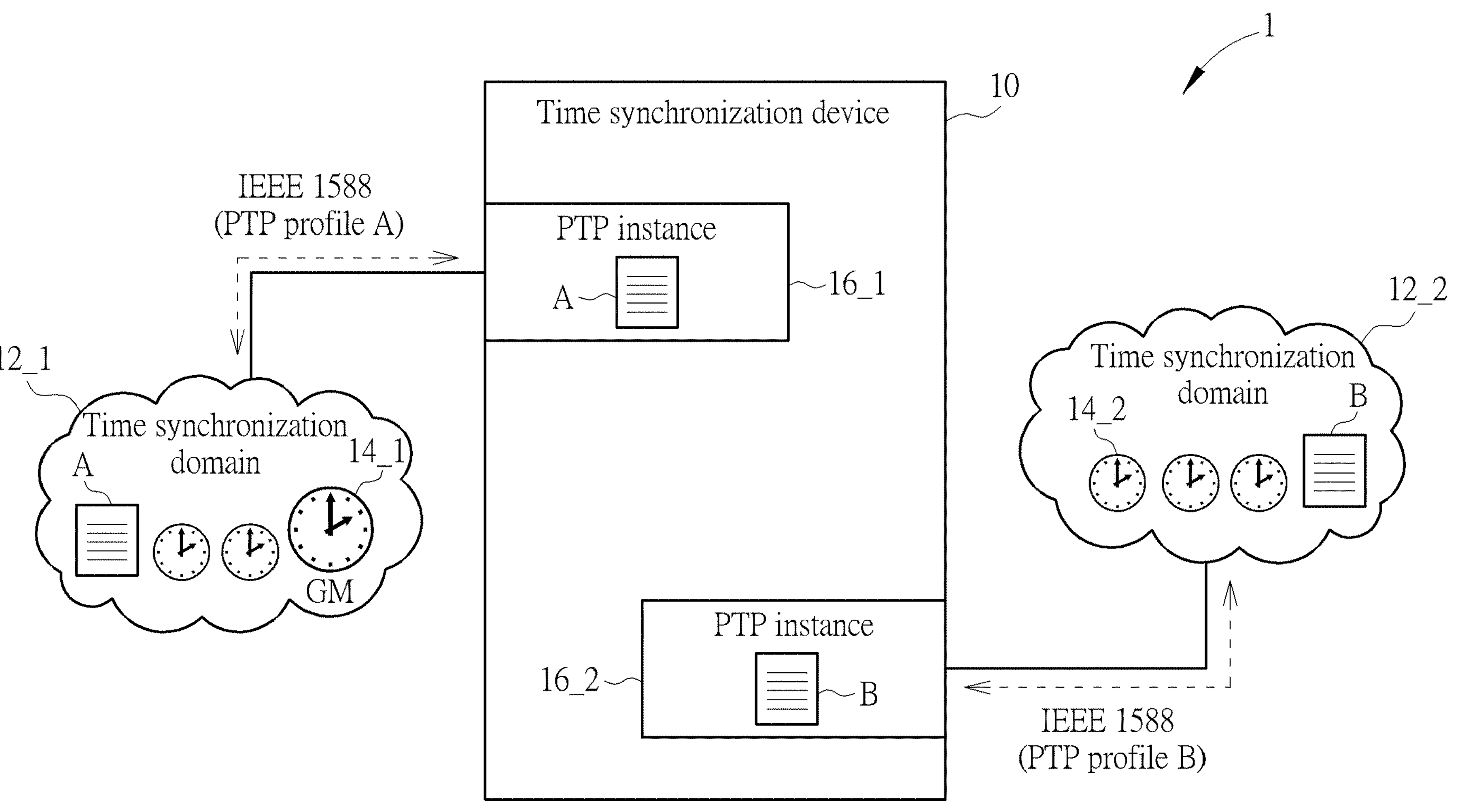
FIG. 4 is a schematic diagram of a time synchronization network system according to an embodiment of the present invention.

Please refer to FIG. 4, which is a schematic diagram of another usage scenario of the time synchronization network system 1 according to an embodiment of the present invention. As shown in FIG. 4, in the time synchronization network system 1, the time synchronization domain 12_1 uses the PTP profile A complying with IEEE 1588, and the time synchronization domain 12_2 uses another PTP profile B complying with IEEE 1588 that is different from the PTP profile A. It should be noted, with the time synchronization device 10, even if both of the time synchronization domains 12_1 and 12_2 use IEEE 1588 PTP profiles, time synchronization domains 12_1 and 12_2 are still unable to synchronize across domains due to the difference in PTP profiles A and B. Through the time synchronization device 10, the communications between the devices in the time synchronization domain 12_1 and the PTP instance 16_1 may be operated according to the PTP profile A of IEEE 1588, while the communications between the PTP instance 16_2 and the devices in the time synchronization domain 12_2 may be operated according to the PTP profile B of IEEE 1588. Accordingly, in addition to realizing the time synchronization across the time synchronization domains 12_1 and 12_1, the time synchronization device 10 of the embodiment of the present invention further improves the accuracy of time synchronization across the time synchronization domains that use different PTP profiles.

Figure 5:
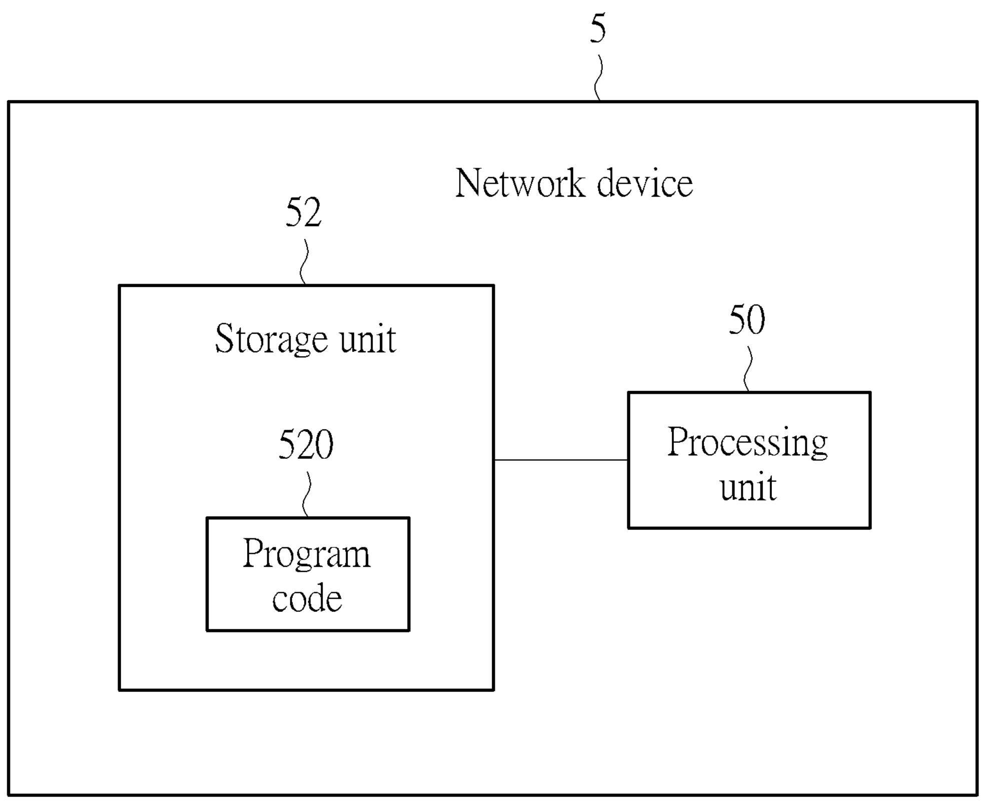
FIG. 5 is a schematic diagram of a network device according to an embodiment of the present invention.

Furthermore, please refer to FIG. 5, which is a schematic diagram of a network device 5 according to an embodiment of the present invention. The network device 5 may be a gateway, a switch, a router, or a bridge operating in the network, but is not limited thereto. Any network device 5 with multiple ports may be used to implement the time synchronization device 10 of the embodiment of the present invention. As shown in FIG. 5, the network device 5 may comprise a processing unit 50 and a storage unit 52. The processing unit 50 may be a general-purpose processor, a microprocessor, an application-specific integrated circuit (ASIC), or combination thereof. The storage unit 52 is coupled to the processing unit 50 and may be any type of data storage devices for storing a program code 520, and the program code 520 is read and executed by the processing unit 50. For example, the storage unit 52 may be a read-only memory (ROM), a flash memory, a random-access memory (RAM), a hard disk, an optical data storage device, a non-volatile storage unit, etc., and is not limited thereto.

The network device 5 is used to represent the necessary components required to implement the embodiments of the present invention, and those skilled in the art may make various modifications and adjustments accordingly, and is not limited to this. For example, when the network device 5 is applied to implement the time synchronization device 10, the time synchronization process 30 may be compiled into the program code 520, stored in the storage unit 52, and executed by the processing unit 50. Moreover, the storage unit 52 is also used for storing the data required for running the time synchronization method, and is not limited thereto.

In summary, the present invention provides a time synchronization method and a time synchronization device to improve the accuracy of time synchronization while performing time synchronization across multiple time synchronization domains that use different type of PTP profiles, improving the shortcomings of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time synchronization method for a time synchronization device, wherein the time synchronization device runs a plurality of precision time protocol (PTP) instances to connect to a plurality of time synchronization domains respectively, and the time synchronization method comprises:

determining whether a frequency of a local PTP clock of the time synchronization device is changed; and updating a frequency of a local clock of the time synchronization device with the frequency of the local PTP clock in response to the frequency of the local PTP clock being changed;

wherein the plurality of PTP instances send PTP messages according to the updated local clock.

2. The time synchronization method of claim 1, wherein one of the plurality of PTP instances is connected to a time synchronization domain operating with a generalized precision time protocol (gPTP).

3. The time synchronization method of claim 2, wherein the one of the plurality of PTP instances computes a rate ratio according to the updated frequency of the local clock.

4. The time synchronization method of claim 2, further comprising sending a PTP message with a timestamp of the updated local clock.

5. The time synchronization method of claim 1, wherein the plurality of time synchronization domains use a plurality of PTP profiles, and the plurality of PTP profiles are different.

6. A time synchronization device, configured to run a plurality of precision time protocol (PTP) instances to connect to a plurality of time synchronization domains respectively, comprising:

a processing unit, configured to execute a program code; and a storage unit, coupled to the processing unit, configured to store the program code to instruct the processing unit to execute a time synchronization method, wherein the time synchronization method comprises:

determining whether a frequency of a local PTP clock of the time synchronization device is changed; and updating a frequency of a local clock of the time synchronization device with the frequency of the local PTP clock in response to the frequency of the local PTP clock being changed;

wherein the plurality of PTP instances send PTP messages according to the updated local clock.

7. The time synchronization device of claim 6, wherein one of the plurality of PTP instances is connected to a time synchronization domain operating with a generalized precision time protocol (gPTP).

8. The time synchronization device of claim 7, wherein the one of the plurality of PTP instances computes a rate ratio according to the updated frequency of the local clock.

9. The time synchronization device of claim 7, wherein the time synchronization method further comprises sending a PTP message with a timestamp of the updated local clock.

10. The time synchronization device of claim 6, wherein the plurality of time synchronization domains use a plurality of PTP profiles, and the plurality of PTP profiles are different.

* * * * *